Jan. 19, 1954 E. M. McMILLAN 2,666,868

ELECTRONIC SWITCH

Filed Jan. 22, 1944 2 Sheets-Sheet 1

Inventor
Edwin M. McMillan

By [signature]

Attorney

Inventor
Edwin M. McMillan

By [signature]
Attorney

UNITED STATES PATENT OFFICE 2,666,868

ELECTRONIC SWITCH

Edwin M. McMillan, San Marino, Calif.

Application January 22, 1944, Serial No. 519,317

1 Claim. (Cl. 315—22)

Figure 1:
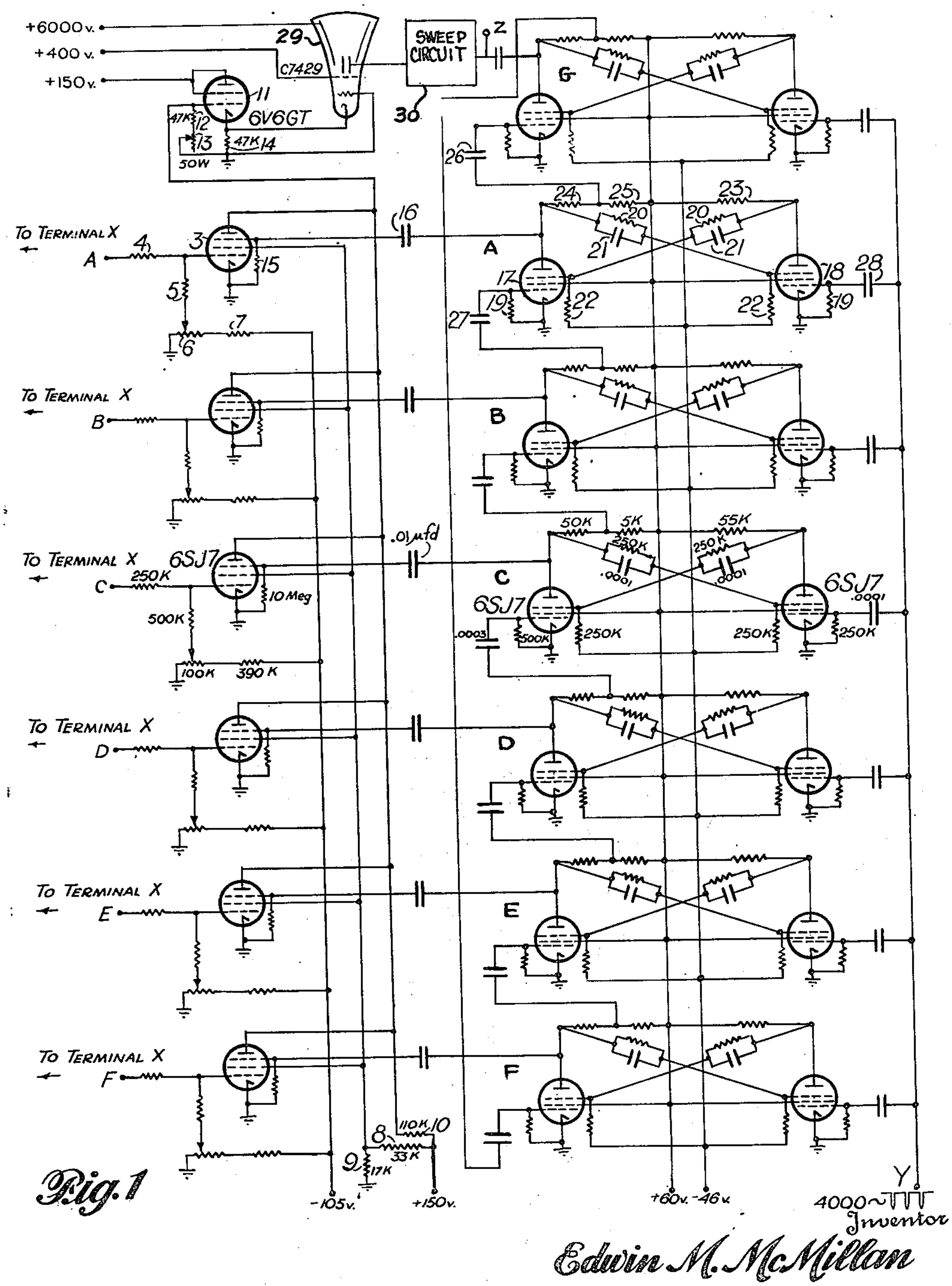

This invention relates to an electronic switch.

It often becomes desirable to simultaneously or alternately measure (view or compare) the outputs of several separate channels, or the various channels on a poly-channel multiplex. If it is desired to do this by connecting the outputs to an indicator in very quick succession, a considerable problem is presented. It may be necessary to switch from one channel to the next at a rate of several thousand times a second in order that substantially simultaneous measurements can be taken, and it is the purpose of this invention to provide means for accomplishing such a switching operation.

In the past, many mechanical systems have been used to perform the functions described above, but, because they are mechanical, they are also subject to failure and error at high frequencies. One of the most common devices presently used is the ordinary rotary switch in which the switch points are connected to the receiver outputs, and the rotary arm is connected to a cathode ray tube, or similar recording unit. This invention, generally speaking, is the electronic equivalent of such a device.

Consequently, one of the objects of the invention is a device for simultaneously recording information received on a poly-channel multiplex, or on separate channels by successively connecting the various channels to a recording instrument.

Another of the objects of the invention is an electronic switch for successively switching a plurality of receiver channels, so that they may be simultaneously viewed on a recording unit.

A further object of the invention is a switch for successively connecting the output terminals of a plurality of channels to a recording instrument without the use of any moving parts.

Still another object of the invention is an electronic switch for successively switching the output terminals of several echo-ranging receivers to a recording unit so that the outputs of said receivers can be simultaneously viewed.

An even further object of the invention is a switching device for successively connecting a plurality of receiving channels to the screen of a cathode ray tube so that the output of all the receivers can be simultaneously studied.

In the drawings:

Fig. 1 is a schematic wiring diagram showing the switching tubes and the ring circuit, together with their terminals.

Figure 2:
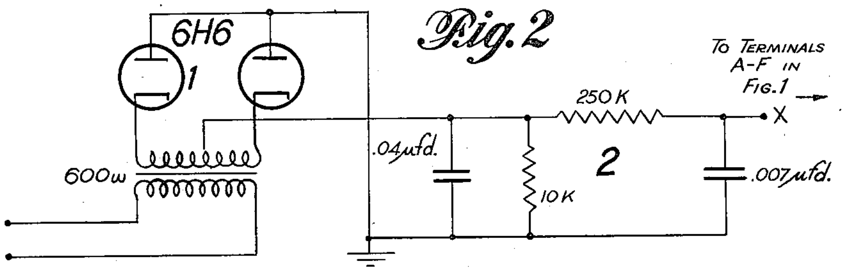

Fig. 2 is a schematic diagram of part of one of the receiving circuits. This is essentially a rectifier and filter for converting the alternating audio signal to its D. C. envelope.

Figure 3:
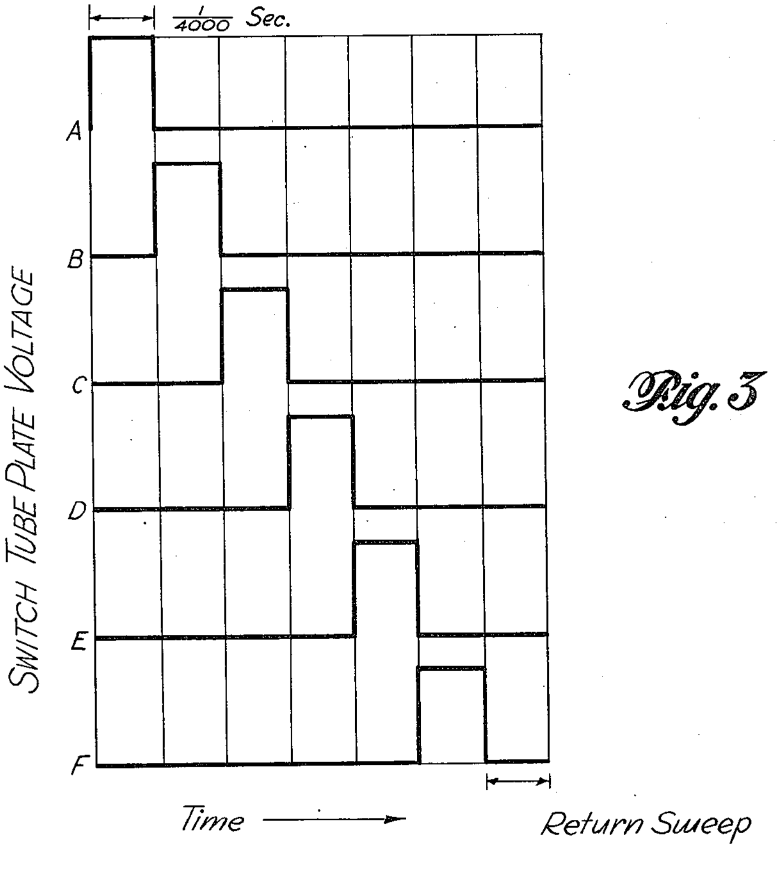

Fig. 3 is a schematic diagram illustrating the time relationship of the voltages applied to the plates of the switch tubes.

Before describing the switch itself, it should be stated that the particular application of the invention herein described is one which was designed for use with a series of echo-ranging receivers, in which, by means of the invention, the output of the various receivers were successively applied to the screen of a cathode ray tube in a manner as to compare the relative amplitudes simultaneously. However, it should be clearly understood that the particular device described herein is illustrative only, and that many other applications and uses will be obvious to those skilled in the art. It is desirable, however, to describe this application specifically for a better understanding of the general principle. The receivers used in this application generated an 800 cycle signal and the cathode ray tube used was an RCA type C7429. Six channels were utilized, but it is also understood that this number might have been made very large, and is limited only by the size of the cathode ray tube screen and the results desired to be accomplished.

The values indicated in Figs. 1 and 2 are illustrative only; but were found to operate satisfactorily in the circuit outlined above. The switch tube and ring circuit components are identical in each case, and values for only one system (C) are shown. Likewise, the numerals indicated in the A circuit are representative of each of the other six circuits.

As has been stated, the application herein described is one which handles six channels, generally designated A, B, C, D, E and F. Each of the six switch tubes is connected by its terminal to the terminals of the receiver output.

In describing the device, it is to be remembered that a receiver circuit, like that shown in Fig. 2 is connected at terminal X to each of the switch circuit systems A, B, C, D, E and F. Likewise, the description of the switch and ring circuits will be limited to system C and that each of the other systems is identical.

Each receiver circuit is composed of a rectifier 1 and a filter 2, in which the cyclic audio frequency is converted into its D. C. envelope and supplied at terminal X.

The resulting envelope, in each case, is fed to one of the corresponding circuits A, B, C, D, E, or F. It is supplied to the grid of switch tube 3 through resistor 4, using system C as an illustration. The tube 3 is biased through resistor 5 and potentiometer 6, whereby the no-signal current in each tube can be set at the same value as set in each of the other tubes. In practice, in this application, a satisfactory value has been found to be about one-tenth of the saturation current. An additional resistor 7 is also included to limit the potentiometer, 6. The screen of the switch tube is fed through resistor 8 and is led to ground through resistor 9. It may also be desirable to provide each switch tube with an individual series screen resistor to prevent lowering of the screen supply voltage by an excessive screen current caused by a particularly strong signal on one channel. The cathode of the tube is grounded as shown.

The plate circuit of the switch tube 3 has a plate resistor 10, in common with the other switch tubes, and likewise, commonly feeds the output stage of tube 11, operating as a cathode follower. The no-signal potential of this tube is determined by resistor 12, and an additional potentiometer 13 to ground, which serves to control the background intensity of the cathode ray spot. The maximum intensity of the spot is limited by the cathode resistor 14, since the cathode ray tube beam current must flow through this resistor. In practice, the value of this resistor is chosen so that maximum brightness is below the point at which the spot begins to "bloom."

The switching operation is made possible by varying the suppressor potential, the suppressor in each case being led to ground through resistor 15, and connected to a corresponding trigger circuit in the ring circuit through the condenser 16, which removes the D. C. component of the current. The ring circuit, which applies the operating voltages to the switch tube comprises a series of sequentially operating trigger circuits each in the form of the well-known Eccles-Jordan trigger circuit. Each trigger circuit of the ring circuit which operates the corresponding switch tube, is composed of a pair of tubes 17, 18. Grid return for each is supplied through resistors 19; which are connected to ground. The cathodes of the tubes are grounded and the screens of each pair are directly connected to one another and to the supply voltage as shown. The suppressor grid of each is connected to the plate of the other of the pair through resistor 20, and condenser 21, connected in parallel; and to the supply through resistor 22. Tube 18 is provided with a single section plate resistor 23, while tube 17 is provided with a split section plate resistor, the sections of which are designated as 24 and 25. The grid of the tube (corresponding to tube 17) in one of the adjacent systems is connected through a condenser 26 to a point between the sections 24, 25 of this plate resistor; and the grid of tube 17 is similarly connected to the mid-point of the same plate resistor in the other adjacent system, through an identical condenser 27. The grid of tube 18 is connected, through condenser 28 to the negative pulse generator at terminal Y.

Although there are only six switch tubes, it is seen that seven trigger circuits in the ring circuit are provided, in order that the extra trigger circuit, shown at the top of Fig. 1 can be used to synchronize the sweep circuit 30 with the operation of the ring circuit and to blank the trace of the cathode ray tube 29 during its return sweep to its starting position. The seven trigger circuits of the ring circuit are connected in a ring as shown with the negative pulses being supplied to the grids of half the tubes (18). Through operation of the ring circuit, positive pulses of a frequency one-seventh of the supplied negative pulse frequency appear at terminal Z, which are applied to the sweep circuit 30. In the application described, the negative pulse frequency is 4000 cycles per second, and as a consequence, the positive pulse frequency generated at terminal Z is 4000/7 cycles per second.

The driver, not shown, which provides the negative pulses to the ring circuit at terminal Y, may be of any conventional type which will generate very short negative pulses, compared to their repetition interval. Very satisfactory operation can be obtained from an oscillator, a square wave generator acting on the limiter principle, and a peaker.

Since the time constants in the entire circuit are quite small, it is necessary that sharp driving pulses be provided. Consequently, the peaker should have a grid circuit of very short time constant which converts the square waves into alternating sharp negative and positive pulses. For the purpose of the invention, it is biased so that plate current flows only on the tops of the positive pulses. In this connection, it should be pointed out that it is desirable to keep the leads between the tubes in the ring circuit as short as possible.

Although, in this application, a frequency of 4000 cycles is illustrated, this can be altered within a wide range so long as the scanning cycle is kept short compared to the time of the fastest change in the signal envelope passing through.

Connection of the common output circuit of the switch tubes to the grid circuit of the cathode ray tube 29 is made through tube 11. The cathodes of the two tubes are directly connected and the grid of the cathode ray tube 29 is grounded. The intensifier and accelerator anodes are externally supplied as shown.

The operation of the invention, in general, consists in so varying the suppressor potentials on the switch tubes in a manner that plate current is flowing in only one switch tube at a time. Control of this flow of plate current is obtained by varying the suppressor potentials of the switch tubes by means of the ring circuit. The operation is such that plate current in the switch tube in system A flows for a short period, and is then cut off, the plate current flows in system B, then C, then D, etc. Thus the current supplied to the grid of the tube 11 controlling the cathode ray tube 29 is made up of short successive portions from each of the switch tubes operative in sequence.

As previously mentioned, the several trigger circuits A, B, C, D, E, F, and G are similar to the well-known Eccles-Jordan circuit wherein conduction in the anode circuit of one tube causes a large reduction in its anode potential, which reduction is coupled to a control element of the other tube in such a manner as to stop anode conduction therein. Thus, only one tube conducts at a time, although such conduction may be by either tube. It will be apparent that the application of a large negative voltage to the control element of the conducting tube will prevent such conduction and will produce a positive pulse on the control element of the other tube to render that tube conductive. However, the application of a negative pulse to the control element of a nonconducting tube produces no effect, and the application of a positive pulse to the control element of a conducting tube also produces no effect.

In the present invention, the anode voltage of one tube in a trigger circuit is coupled to the control grid of a corresponding tube in another trigger circuit to form a cascade ring circuit. In normal operation, all but one of the trigger circuits are operated at any time with the right-hand tube nonconducting, with the right-hand tube in the remaining trigger circuit conducting, so that a negative operating pulse applied to the control grids of these tubes will affect only the conducting left-hand tube in the remaining trigger circuit. The right-hand tube in the remaining trigger circuit is nonconductive and its anode is at the potential of the voltage supply, while the other right-hand tubes are conductive and have low anode potentials.

For the purposes of illustration, let it be assumed that in trigger circuits A, B, C, D, E, and G, the right-hand tubes are nonconducting and the left-hand tubes are conducting, while in trigger circuit F the right-hand tube is conducting and the left-hand tube is nonconducting. The application of a negative voltage to terminal Y will stop conduction of the right-hand tube in trigger circuit F without affecting the corresponding tubes in the remaining circuits. When such conduction stops, a positive voltage pulse is applied to the suppressor grid of the left-hand tube in circuit F to render that tube conductive and produce a negative pulse at its anode.

The negative pulse at the anode of the left-hand tube in circuit F is coupled to the conducting left-hand tube in circuit E to render that tube non-conductive and to produce a positive pulse at its anode, which positive pulse does not affect the conduction of the already conducting left-hand tube in circuit D. However, the positive pulse is also applied to the nonconducting right-hand tube in circuit E to render that tube conductive and therefore responsive to the next negative pulse applied to terminal Y. The action of the cascade ring circuit is therefore advanced to the next (another) trigger circuit, and a similar action occurs whenever a negative pulse is applied to terminal Y. Since the left-hand tube of each trigger circuit must determine the conductive state of that circuit, the grid circuit of the left-hand tubes are provided with longer time constants that are the right-hand tubes.

As will be obvious, other methods of operating the ring circuit are possible. If two of the non-adjacent right-hand tubes are originally conducting, and pulses are supplied at terminal Y, then two pulses, instead of one, will be running around the ring circuit. Three pulses are also possible with the present application, and this number could be further increased if the number of systems were increased. However, since in many cases more than one pulse may be undesirable, proper starting conditions may be insured by removing the screen voltage from one left tube. The pulses traveling around the ring will then "pile up" at this point, leaving only one left tube conducting. If the screen voltage is then supplied, the single-pulse operation proceeds.

As has been stated, the switching operation is accomplished by varying the suppressor grid potential of the switch tubes. Since only one of the left tubes of the ring circuit is not conducting at any given time during a complete cycle of operations, the anode potential of each left tube will be found to rise only once during each cycle. Likewise, this rise in potential will be transferred to the suppressor grid of the corresponding switch tube during the time the left-hand tube of associated trigger circuit is nonconducting by the coupling condenser 16. The time constant of the coupling condenser 16 and resistor 15 is made long with respect to the operation of the trigger circuit S. When a progression in the operation of the ring circuit occurs, the switch tube operates as a D. C. amplifier, and its output is impressed on the grid of tube 11, so that the amplitude of the received signal is indicated on the screen of the cathode ray tube 29. This condition is brought about once each cycle by the corresponding ring circuit components, therefore the signal from each receiver is indicated on the screen of the cathode ray tube in the same sequence once during each cycle.

While the switch tube has plate current flowing, the suppressor grid coupling condenser 16 collects sufficient charge that, when the anode potential of the left-hand tube in the associated trigger circuit drops (due to the stepping action of the ring circuit) the suppressor grid is made negative, thus blocking the plate current. At the same time, the ring circuit causes the next switch tube to conduct, and so on, till the cycle is completed.

The voltages supplied by the ring circuit to the switch tubes are indicated in Fig. 3. The positive pulses thus supplied are seen to occur at the rate of 4000 per second, the same as the number of pulses supplied at terminal Y. If the cycle is assumed to pass from component A to F, it is seen that a positive pulse is supplied to the plate of switch tube in A system during the first 1/4000 second, to switch tube in B system during the next 1/4000 second, etc. During the last, or seventh, 1/4000 second of the cycle, a positive pulse is supplied, not to any switch tube, but is supplied as a synchronizing pulse to the sweep circuit 30 of the cathode ray tube 29 to synchronize the return of the spot to its original position after the cycle is completed. It is thus seen that while the spot passes across the screen of the cathode ray tube, its intensity is determined by the strength of the signal output during its course of travel. Since its sweep frequency is so high, the relative amplitudes of the signal on the various receivers will be reflected in the intensity of the corresponding portion of the pattern as the spot passes across the screen. It is obvious that while the trigger circuit G is thus operating during the return of the spot, there is a blank interval during which all of the switch tubes are blocked, so that no signal is visible during the return or "flyback" time.

I claim:

An electronic switch comprising, a plurality of trigger circuits having two stable conditions, each said trigger circuit comprising a pair of pentode tubes, each having at least an anode, a cathode, a control grid and a suppressor grid, a cathode-anode circuit for each tube, coupling means interconnecting the cathode-anode circuit of each pentode tube with the suppressor grid of the other electron tube of the respective pair of pentode tubes, means connecting the cathode-anode circuit of a first pentode tube in a respective trigger circuit to the control grid of a corresponding pentode tube in another trigger circuit whereby to form a cascade ring of trigger circuits, a number of pentode switch tubes equal to one less than the number of trigger circuits in said cascade ring, each having at least a control grid, a suppressor grid, and an anode, said anodes of said switch tubes being connected in parallel to each other to form a common output circuit, a cathode ray tube connected to said common output circuit, a sweep circuit for said cathode ray tube, individualized input means connected to said control grids of said switch tubes, individualized means coupling each suppressor grid of said switch tubes to the cathode-anode circuit of one of said first tubes in respective ones of said trigger circuit, pulse means coupled to the control grids of the second pentode tubes in said trigger circuits in parallel with each other for impressing negative pulse voltages thereon, and synchronizing means connecting the cathode-anode circuit of the first tube in the remaining trigger circuit with said sweep circuit, whereby the indicator means sequentially receives the respective outputs of said switch tubes at a rate determined by the pulsing rate of said pulse means.

EDWIN M. McMILLAN.

References Cited in the file of this patent

UNITED STATES PATENTS

| Number | Name | Date |
|---|---|---|
| 2,146,862 | Shumard | Feb. 14, 1939 |
| 2,158,285 | Koch | May 16, 1939 |
| 2,221,115 | Shepard, Jr. | Nov. 12, 1940 |
| 2,272,070 | Reeves | Feb. 3, 1942 |
| 2,306,386 | Hollywood | Dec. 29, 1942 |
| 2,402,432 | Mumma | June 18, 1946 |
| 2,403,918 | Grosdoff | July 16, 1946 |
| 2,404,918 | Overbeck | July 30, 1946 |
| 2,416,095 | Gulden | Feb. 18, 1947 |
| 2,426,454 | Johnson | Aug. 26, 1947 |
| 2,534,233 | Cleeton | Dec. 19, 1950 |